(12) United States Patent
Ohkawa

(10) Patent No.: US 11,954,392 B2
(45) Date of Patent: Apr. 9, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Kazuhiro Ohkawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 482 days.

(21) Appl. No.: 16/900,083

(22) Filed: Jun. 12, 2020

(65) Prior Publication Data

US 2021/0173602 A1   Jun. 10, 2021

(30) Foreign Application Priority Data

Dec. 5, 2019   (JP) .................................. 2019-220542

(51) Int. Cl.
*G06F 3/12* (2006.01)
*G06F 9/48* (2006.01)

(52) U.S. Cl.
CPC .......... *G06F 3/1296* (2013.01); *G06F 9/4887* (2013.01)

(58) Field of Classification Search
CPC .... G06F 3/1296; G06F 9/4887; G06F 3/1282; G06F 3/1203; G06F 3/1217; G06F 3/1229; G06F 3/1262
See application file for complete search history.

(56) References Cited

U.S. PATENT DOCUMENTS

| 8,508,768 | B2 | 8/2013 | Sekine | |
|---|---|---|---|---|
| 2006/0282343 | A1* | 12/2006 | Palanisamy | G06Q 10/087 705/28 |
| 2008/0080006 | A1* | 4/2008 | Paskalev | G06F 3/1219 358/1.18 |
| 2013/0070287 | A1* | 3/2013 | Atawneh | G06K 15/1823 358/1.15 |
| 2014/0040913 | A1* | 2/2014 | Wuttke | G06F 9/50 718/104 |
| 2019/0243740 | A1* | 8/2019 | Kambe | G06F 11/3006 |

FOREIGN PATENT DOCUMENTS

| JP | 2009-271931 | A | 11/2009 |
|---|---|---|---|
| JP | 2013-252675 | A | 12/2013 |
| JP | 2016-057932 | A | 4/2016 |
| JP | 2016-124255 | A | 7/2016 |

OTHER PUBLICATIONS

Jul. 25, 2023 Office Action issued in Japanese Patent Application No. 2019-220542.

* cited by examiner

*Primary Examiner* — John R Wallace
(74) *Attorney, Agent, or Firm* — Oliff PLC

(57) ABSTRACT

An information processing apparatus includes a processor configured to create a group of jobs to be executed that have a common attribute, acquire, before execution of the jobs, information on materials used for execution of the jobs or a storage place for storing products obtained as a result of execution of the jobs, the information indicating that the materials or the storage place, which is not suitable for execution of the jobs at a time of creation of the group, reaches a state suitable for execution of the jobs after creation of the group, and create an execution plan so that the jobs are executed per group in a time window in which the materials or the storage place reaches the state suitable for execution of the jobs by using the information.

10 Claims, 14 Drawing Sheets

FIG. 5

|  | KIND OF PAPER | NUMBER OF PRINTED COPIES 54A |
|---|---|---|
| JOB 1 | PAPER A | 3000 COPIES |
| JOB 2 | PAPER B | 5000 COPIES |
| JOB 3 | PAPER A | 5000 COPIES |
| JOB 4 | PAPER A | 5000 COPIES |
| JOB 5 | PAPER B | 4000 COPIES |
| JOB 6 | PAPER A | 3000 COPIES |
| JOB 7 | PAPER A | 4000 COPIES |
| JOB 8 | PAPER B | 4000 COPIES |

FIG. 6

| MATERIAL | NUMBER OF SHEETS OF PAPER CURRENTLY IN STOCK | SCHEDULED TIME AND DATE OF ARRIVAL | NUMBER OF SHEETS OF PAPER SCHEDULED TO ARRIVE |
|---|---|---|---|
| PAPER A | 9000 SHEETS OF PAPER | 17:00 ON JANUARY 10 | 5000 SHEETS OF PAPER |
| PAPER B | 8000 SHEETS OF PAPER | 17:00 ON JANUARY 10 | 5000 SHEETS OF PAPER |

| OPERATING TIME WINDOW OF PRINTER 20A | 8:00 TO 18:00 |
|---|---|
| OPERATING TIME WINDOW OF PRINTER 20B | 9:00 TO 19:00 |

|  | KIND OF PAPER | NUMBER OF PRINTED COPIES | GROUP NAME |
|---|---|---|---|
| JOB 1 | PAPER A | 3000 COPIES | GROUP 1 |
| JOB 2 | PAPER B | 5000 COPIES | GROUP 2 |
| JOB 3 | PAPER A | 5000 COPIES | GROUP 1 |
| JOB 4 | PAPER A | 5000 COPIES |  |
| JOB 5 | PAPER B | 4000 COPIES |  |
| JOB 6 | PAPER A | 3000 COPIES |  |
| JOB 7 | PAPER A | 4000 COPIES |  |
| JOB 8 | PAPER B | 4000 COPIES |  |

FIG. 10

| | KIND OF PAPER | NUMBER OF PRINTED COPIES | GROUP NAME | EXECUTION PLAN |
|---|---|---|---|---|
| JOB 1 | PAPER A | 3000 COPIES | GROUP 1 | 8:00 TO 18:00 ON JANUARY 10 |
| JOB 2 | PAPER B | 5000 COPIES | GROUP 2 | 8:00 TO 18:00 ON JANUARY 10 |
| JOB 3 | PAPER A | 5000 COPIES | GROUP 1 | 8:00 TO 18:00 ON JANUARY 10 |
| JOB 4 | PAPER A | 5000 COPIES | | |
| JOB 5 | PAPER B | 4000 COPIES | | |
| JOB 6 | PAPER A | 3000 COPIES | | |
| JOB 7 | PAPER A | 4000 COPIES | | |
| JOB 8 | PAPER B | 4000 COPIES | | |

| | KIND OF PAPER | NUMBER OF PRINTED COPIES | GROUP NAME | EXECUTION PLAN |
|---|---|---|---|---|
| JOB 1 | PAPER A | 3000 COPIES | GROUP 1 | 8:00 TO 18:00 ON JANUARY 10 |
| JOB 2 | PAPER B | 5000 COPIES | GROUP 2 | 8:00 TO 18:00 ON JANUARY 10 |
| JOB 3 | PAPER A | 5000 COPIES | GROUP 1 | 8:00 TO 18:00 ON JANUARY 10 |
| JOB 4 | PAPER A | 5000 COPIES | GROUP 3 | |
| JOB 5 | PAPER B | 4000 COPIES | GROUP 4 | |
| JOB 6 | PAPER A | 3000 COPIES | | |
| JOB 7 | PAPER A | 4000 COPIES | | |
| JOB 8 | PAPER B | 4000 COPIES | GROUP 4 | |

| | KIND OF PAPER | NUMBER OF PRINTED COPIES | GROUP NAME | EXECUTION PLAN |
|---|---|---|---|---|
| JOB 1 | PAPER A | 3000 COPIES | GROUP 1 | 8:00 TO 18:00 ON JANUARY 10 |
| JOB 2 | PAPER B | 5000 COPIES | GROUP 2 | 8:00 TO 18:00 ON JANUARY 10 |
| JOB 3 | PAPER A | 5000 COPIES | GROUP 1 | 8:00 TO 18:00 ON JANUARY 10 |
| JOB 4 | PAPER A | 5000 COPIES | GROUP 3 | 8:00 TO 18:00 ON JANUARY 11 |
| JOB 5 | PAPER B | 4000 COPIES | GROUP 4 | 8:00 TO 18:00 ON JANUARY 11 |
| JOB 6 | PAPER A | 3000 COPIES | | |
| JOB 7 | PAPER A | 4000 COPIES | | |
| JOB 8 | PAPER B | 4000 COPIES | GROUP 4 | 8:00 TO 18:00 ON JANUARY 11 |

| NUMBER OF SHEETS OF PAPER CURRENTLY STOCKABLE | SCHEDULED TIME AND DATE OF INCREASE OF NUMBER OF STOCKABLE SHEETS OF PAPER | NUMBER OF SHEETS OF PAPER SCHEDULED TO NEWLY BECOME STOCKABLE |
|---|---|---|
| 17000 COPIES | 17:00 ON JANUARY 10 | 10000 COPIES |

| | KIND OF PAPER | NUMBER OF PRINTED COPIES | GROUP NAME | EXECUTION PLAN |
|---|---|---|---|---|
| JOB 1 | PAPER A | 3000 COPIES | GROUP 1 | 8:00 TO 18:00 ON JANUARY 10 |
| JOB 2 | PAPER B | 5000 COPIES | GROUP 2 | 8:00 TO 18:00 ON JANUARY 10 |
| JOB 3 | PAPER A | 5000 COPIES | GROUP 1 | 8:00 TO 18:00 ON JANUARY 10 |
| JOB 4 | PAPER A | 5000 COPIES | GROUP 3 | |
| JOB 5 | PAPER B | 4000 COPIES | GROUP 4 | |
| JOB 6 | PAPER A | 3000 COPIES | GROUP 3 | |
| JOB 7 | PAPER A | 4000 COPIES | | |
| JOB 8 | PAPER B | 4000 COPIES | | |

| | KIND OF PAPER | NUMBER OF PRINTED COPIES | GROUP NAME | EXECUTION PLAN |
|---|---|---|---|---|
| JOB 1 | PAPER A | 3000 COPIES | GROUP 1 | 8:00 TO 18:00 ON JANUARY 10 |
| JOB 2 | PAPER B | 5000 COPIES | GROUP 2 | 8:00 TO 18:00 ON JANUARY 10 |
| JOB 3 | PAPER A | 5000 COPIES | GROUP 1 | 8:00 TO 18:00 ON JANUARY 10 |
| JOB 4 | PAPER A | 5000 COPIES | GROUP 3 | 8:00 TO 18:00 ON JANUARY 11 |
| JOB 5 | PAPER B | 4000 COPIES | GROUP 4 | 8:00 TO 18:00 ON JANUARY 11 |
| JOB 6 | PAPER A | 3000 COPIES | GROUP 3 | 8:00 TO 18:00 ON JANUARY 11 |
| JOB 7 | PAPER A | 4000 COPIES | | |
| JOB 8 | PAPER B | 4000 COPIES | | |

| | KIND OF PAPER | NUMBER OF PRINTED COPIES | REQUIRED TIME | GROUP NAME | EXECUTION PLAN |
|---|---|---|---|---|---|
| JOB 1 | PAPER A | 3000 COPIES | 30 MINUTES | GROUP 1 | 8:00 TO 8:30 ON JANUARY 10 |
| JOB 2 | PAPER B | 5000 COPIES | 50 MINUTES | GROUP 2 | 9:20 TO 10:10 ON JANUARY 10 |
| JOB 3 | PAPER A | 5000 COPIES | 50 MINUTES | GROUP 1 | 8:30 TO 9:20 ON JANUARY 10 |
| JOB 4 | PAPER A | 5000 COPIES | 50 MINUTES | GROUP 3 | 8:00 TO 8:50 ON JANUARY 11 |
| JOB 5 | PAPER B | 4000 COPIES | 40 MINUTES | GROUP 4 | 8:50 TO 9:30 ON JANUARY 11 |
| JOB 6 | PAPER A | 3000 COPIES | 40 MINUTES | | |
| JOB 7 | PAPER A | 4000 COPIES | 40 MINUTES | | |
| JOB 8 | PAPER B | 4000 COPIES | 40 MINUTES | GROUP 4 | 9:30 TO 10:10 ON JANUARY 11 |

54A

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-220542 filed Dec. 5, 2019.

BACKGROUND

(i) Technical Field

The present disclosure relates to an information processing apparatus and a non-transitory computer readable medium.

(ii) Related Art

Japanese Unexamined Patent Application Publication No. 2013-252675 discloses a print data management apparatus including a printing material stock information acquisition unit that acquires printing material stock information on a stock of printing materials such as recording media stored in a print destination that receives print data, a requested printing material information acquisition unit that acquires, from the print data, requested printing material information on printing materials such as recording media necessary for execution of the print data, a print data management unit that receives the print data, registers the print data in a print queue in a predetermined order, and manages a print order of the print data in the order of the print queue, a printing permission/rejection determining unit that determines whether to permit or reject printing on the basis of the requested printing material information of one piece of print data registered in the print queue, the requested printing material information of another piece of print data previous to the one piece of print data in the print queue, and the printing material stock information, a suspending unit that suspends print data rejected by the printing permission/rejection determining unit by removing the print data from the print queue and storing the removed print data in a suspended data storage unit, a requested printing completion time limit information acquisition unit that acquires requested printing completion time limit information on a printing completion time limit requested for at least the suspended print data stored in the suspended data storage unit, and a return unit that returns the suspended print data to the print queue when a remaining time before the printing completion time limit reaches a predetermined remaining time on the basis of a current time and the requested printing completion time limit information of the suspended print data.

SUMMARY

In some cases, for example, processing is performed per group of jobs having a common attribute. In such cases, a user may want to create an execution plan for executing the jobs of the group on the basis of the attribute and information, such as materials or a storage place for storing the materials at a time of creation of the group, that changes from the time of creation of the group to a time of execution of the processing. Conventionally, however, in a case where the materials or the storage place is in a state unsuitable for execution of the jobs at the time of creation of the group, it is impossible to create an execution plan for executing the jobs in a time window in which the jobs become executable even if the materials or the storage place becomes suitable for execution of the jobs after the time of creation of the group.

Aspects of non-limiting embodiments of the present disclosure relate to making it possible to create an execution plan for executing jobs per group of jobs having a common attribute in a time window in which materials or a storage place for storing the materials is in a state suitable for execution of the jobs even in a case where the materials or the storage place is in a state unsuitable for execution of the jobs at a time of creation of the group.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to create a group of jobs to be executed that have a common attribute, acquire, before execution of the jobs, information on materials used for execution of the jobs or a storage place for storing products obtained as a result of execution of the jobs, the information indicating that the materials or the storage place, which is not suitable for execution of the jobs at a time of creation of the group, reaches a state suitable for execution of the jobs after creation of the group, and create an execution plan so that the jobs are executed per group in a time window in which the materials or the storage place reaches the state suitable for execution of the jobs by using the information.

BRIEF DESCRIPTION OF THE DRAWINGS

FIG. 5 illustrates a database concerning job information stored in the information processing apparatus according to the first exemplary embodiment;

FIG. 6 illustrates a database concerning material information stored in the information processing apparatus according to the first exemplary embodiment;

FIG. 7 illustrates a database concerning information on an operating time window of a printer stored in the information processing apparatus according to the first exemplary embodiment;

FIG. 9 illustrates creation of groups based on the database illustrated in FIG. 5;

FIG. 10 illustrates creation of an execution plan based on the database illustrated in FIG. 9;

FIG. 11 illustrates further creation of groups based on the database illustrated in FIG. 10;

FIG. 12 illustrates further creation of an execution plan based on the database illustrated in FIG. 11;

FIG. 13 illustrates a database concerning storage place information stored in an information processing apparatus according to a second exemplary embodiment;

FIG. 15 illustrates creation of groups based on a database according to the second exemplary embodiment;

FIG. 16 illustrates creation of an execution plan based on the database illustrated in FIG. 15; and FIG. 17 illustrates creation of an execution plan based on a database according to a second modification.

DETAILED DESCRIPTION

Exemplary embodiments of the present disclosure are described below with reference to the drawings.

First Exemplary Embodiment

Figure 1:
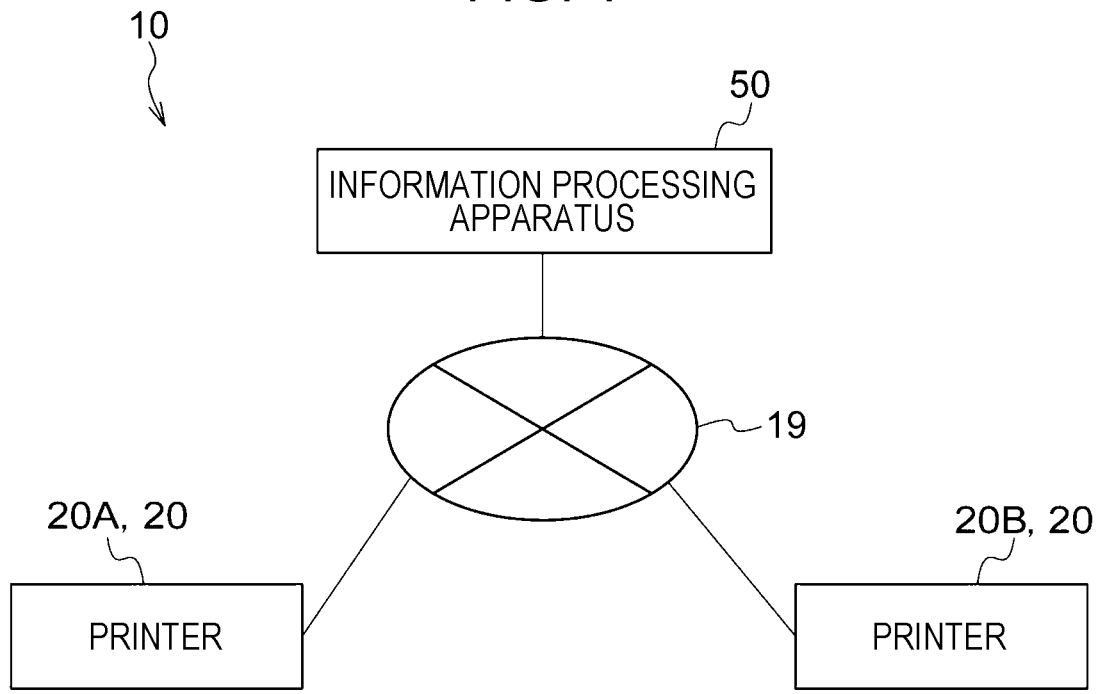
FIG. 1 is a schematic view illustrating a configuration of a printing system according to a first exemplary embodiment.

A printing system 10 illustrated in FIG. 1 is a system for printing on a recording medium. In other words, the printing system 10 is an execution system that executes a job. In the present exemplary embodiment, the "job" refers to a print job and is a unit of processing of a print operation designated by a single print instruction.

Specifically, the printing system 10 includes plural (specifically two) printers 20 and an information processing apparatus 50 as illustrated in FIG. 1. The information processing apparatus 50 and the printers 20 are communicably connected to one another through a wired or wireless communication line 19 such as the Internet or a local area network (LAN).

The elements (specifically, the printers 20 and the information processing apparatus 50) of the printing system 10 are described below.

Printer 20

Figure 2:
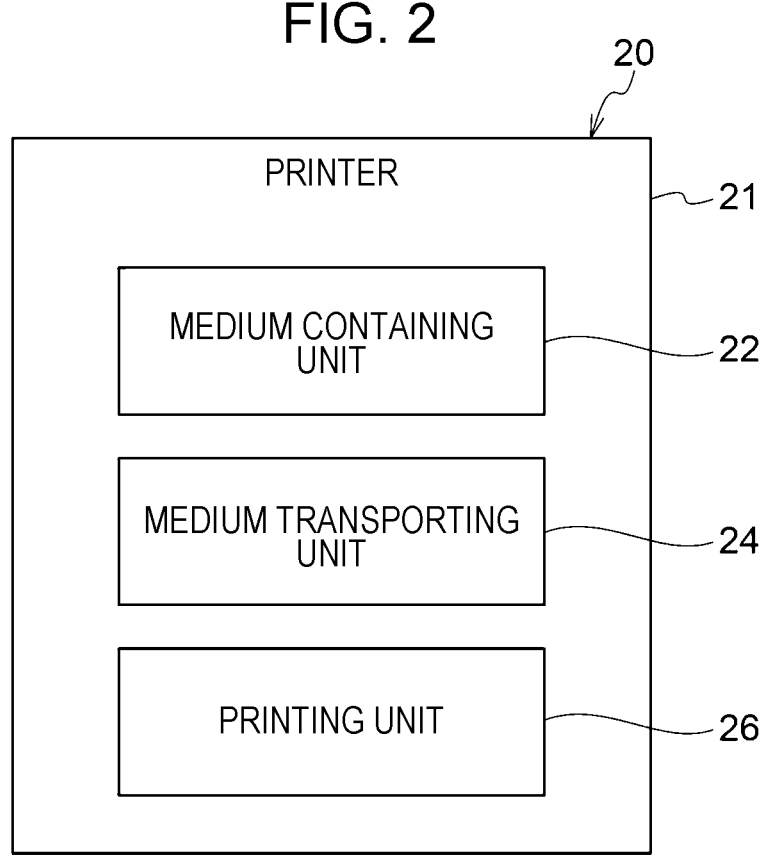
FIG. 2 is a block diagram schematically illustrating a configuration of a printer according to the first exemplary embodiment.

Each of the printers 20 illustrated in FIG. 2 is a device for printing on a recording medium. In other words, the printer 20 is an execution device that executes a job. As illustrated in FIG. 2, for example, the printer 20 has a medium containing unit 22, a medium transporting unit 24, and a printing unit 26.

The medium containing unit 22 contains recording media therein. For example, the medium containing unit 22 can be drawn out and stored into a body 21 of the printer 20. For example, an operator who operates the printer 20 stores recording media in the medium containing unit 22 drawn out from the body 21 and then pushes the medium containing unit 22 into the body 21.

The medium transporting unit 24 transports a recording medium stored in the medium containing unit 22 to the printing unit 26. The printing unit 26 performs printing on the recording medium transported by the medium transporting unit 24. In other words, the printing unit 26 is an execution unit that executes a job. Specifically, the printing unit 26 performs printing on the recording medium through steps such as charging, exposure, development, transfer, and fixation.

Information Processing Apparatus 50

Figure 3:
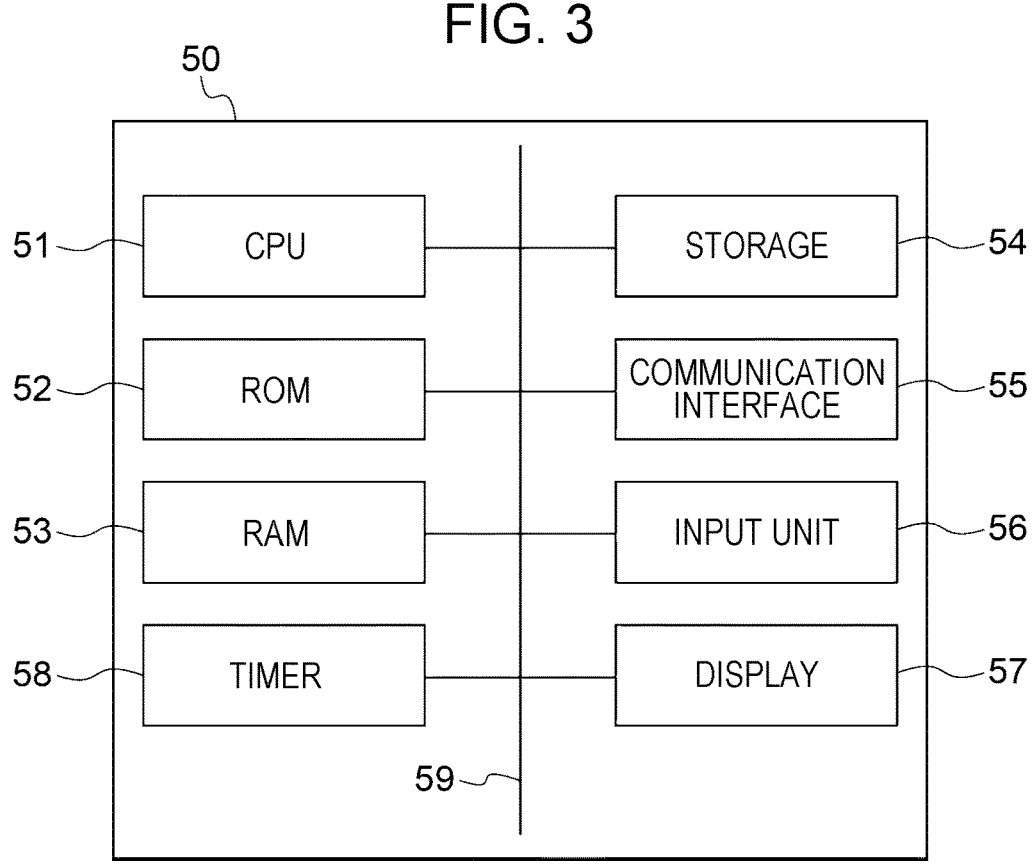
FIG. 3 is a block diagram illustrating a hardware configuration of the information processing apparatus according to the first exemplary embodiment.

The information processing apparatus 50 illustrated in FIG. 3 is an apparatus for processing information. The information processing apparatus 50 is, for example, a personal computer (PC) connected to the printers 20 through the communication line 19. The information processing apparatus 50 may be a server apparatus or the like connected to the printers 20 through the communication line 19.

Specifically, the information processing apparatus 50 has functions of a computer and has a central processing unit (CPU) 51, a read only memory (ROM) 52, a random access memory (RAN) 53, a storage 54, a communication interface 55, an input unit 56, a display 57, and a timer 58, as illustrated in FIG. 3. These units of the information processing apparatus 50 are communicably connected to one another through a bus 59.

The CPU 51 executes various programs including an information processing program and controls each unit. That is, the CPU 51 reads out a program from the ROM 52 or the storage 54 and executes the program while using the RAM 53 as a work area.

The ROM 52 stores various programs and various data therein. The RAM 53 serves as a work area and temporarily stores a program or data therein. The storage 54 is a hard disk drive (HDD) or a solid state drive (SSD) and stores therein various programs including an operating system and various data.

The communication interface 55 is an interface for communicating with another apparatus such as the printer 20. The input unit 56 is used for various kinds of input, and examples of the input unit 56 include a pointing device such as a mouse and a keyboard. The display 57 is, for example, a liquid crystal display and displays various kinds of information. The display 57 may be a touch panel display. In this case, the display 57 may also function as the input unit 56. The timer 58 is a time measuring unit that measures current time and date.

Figure 4:
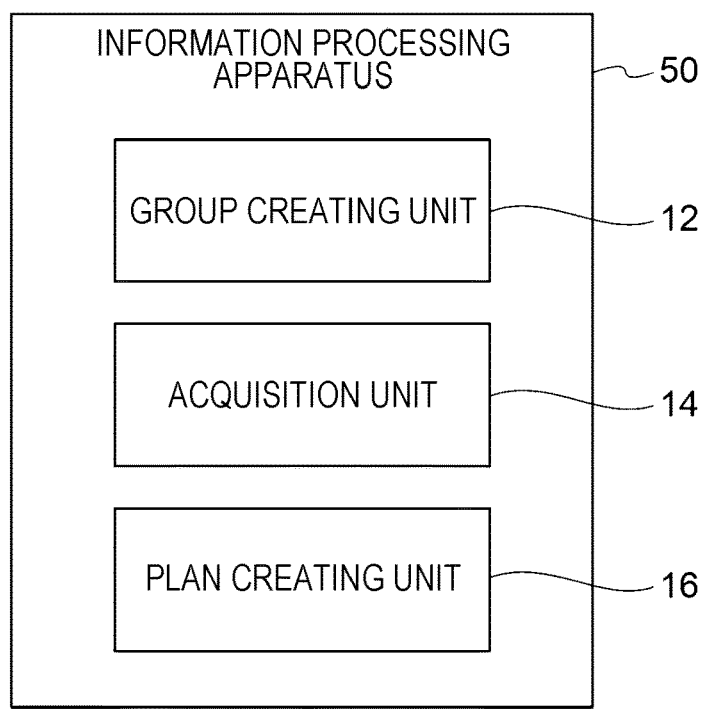
FIG. 4 is a block diagram illustrating an example of a functional configuration of the information processing apparatus according to the first exemplary embodiment.

The information processing apparatus 50 realizes various functions by executing the programs by using hardware resources. A functional configuration realized by the information processing apparatus 50 is described below. FIG. 4 is a block diagram illustrating an example of the functional configuration of the information processing apparatus 50.

As illustrated in FIG. 4, the information processing apparatus 50 has a group creating unit 12, an acquisition unit 14, and a plan creating unit 16 as functional elements. The CPU 51 reads out and executes the information processing program (specifically, an execution plan creating processing program) stored in the ROM 52 or the storage 54, and these functional elements are thus realized.

The group creating unit 12 creates a group of jobs to be executed on the basis of an attribute (hereinafter referred to as a job attribute) common to the jobs in accordance with an instruction from a person. This person who gives the instruction may be the same as an operator or may be different from the operator. Specifically, the group creating unit 12 creates a group of jobs having a common job attribute so that an amount of materials consumed by execution of the jobs is kept equal to or smaller than an available amount of materials (described later).

The "jobs to be executed" are jobs indicative of what is to be printed by the printer 20 upon receipt of an execution instruction.

The "job attribute" is characteristics common to plural jobs, and a group is created on the basis of the job attribute. In the present exemplary embodiment, this attribute is the kind of paper (specifically, a material of which paper is made and a size of paper) designated by the jobs and used for execution of the jobs.

For example, in a case where there are plural jobs that use paper A and plural jobs that use paper B, the group creating unit 12 creates a group of the jobs that use the paper A and a group of jobs that use the paper B.

The "person who gives the instruction" is a person who gives an instruction to create an execution plan for executing jobs by using the input unit 56.

Note that the attribute may be any of other attributes designated by the jobs such as the number of copies to be printed, a printing speed, a customer ID, a shipping timetable, the number of colors, and which of the printers 20 will execute the jobs, and a group of jobs may be created for each of these attributes.

The acquisition unit 14 acquires information (hereinafter referred to as job information) on a job to be executed before execution of the job. The job information includes information on the number of copies (specifically, the number of copies to be printed) obtained as a result of execution of the job and information on an attribute of the job. In the present exemplary embodiment, for example, the acquisition unit 14 acquires the job information from a printer 20A or a printer 20B through the communication line 19. Alternatively, the acquisition unit 14 may acquire job information entered by a user by using the input unit 56.

The job information acquired by the acquisition unit 14 is stored in the storage 54 as a database 54A (see FIG. 5). Specifically, as illustrated in FIG. 5, information on the number of copies to be printed and the kind of paper used for printing is stored for each job as the database 54A in the storage 54. The database 54A illustrated in FIG. 5 is an example of a database.

In a case where a deadline is set for products obtained as a result of execution of a job, the job information may include information on a deadline such as a deadline of execution of the job or a deadline of completion of execution of the job. The "products obtained as a result of execution of a job" are products generated from materials as a result of execution of the job. In a case where the job is a print job, the "products obtained as a result of execution of a job" are printed materials.

Furthermore, the acquisition unit 14 acquires information (hereinafter referred to as material information) on materials used for execution of a job before execution of the job. The materials are materials necessary for execution of the job. The materials include media that are externally supplied or offered and can be separated from an apparatus for creating an execution plan or an apparatus for executing the job. For example, in a case where the job is a print job, the materials include consumables such as ink and paper. Specifically, the material information includes, for example, information on consumables used for printing such as ink and recording media such as paper (e.g., roll paper, continuous paper, cut paper). In the present exemplary embodiment, for example, the acquisition unit 14 acquires information on paper used for printing.

More specifically, the acquisition unit 14 acquires, as the material information, information on the number of materials in stock available at a time of creation of a group and information on scheduled time and date of arrival of the materials after creation of the group and the number of materials scheduled to arrive after creation of the group. Furthermore, the acquisition unit 14 acquires current time and date as information on the time of creation of the group. Note that the acquisition unit 14 acquires the information on the current time and date from the timer 58.

The material information acquired by the acquisition unit 14 is stored in the storage 54 as a database 54B (see FIG. 6). Specifically, as illustrated in FIG. 6, information on the number of sheets of paper currently in stock, scheduled time and date of arrival of paper, and the number of sheets of paper scheduled to arrive is stored for each kind of paper in the storage 54 as the database 54B. The database 54B illustrated in FIG. 6 is an example of a database.

Furthermore, before execution of a job, the acquisition unit 14 acquires information, managed for each printer 20, on an operating time window from start to end of operation of the printer 20. This information is stored in the storage 54 as a database 54C illustrated in FIG. 7. Note that the printer 20 is an example of an apparatus. The database 54C illustrated in FIG. 7 is an example of a database.

In the present exemplary embodiment, the material information and the information on the operating time windows of the printers 20 are entered by a user by using the input unit 56, and the acquisition unit 14 acquires these pieces of information thus entered by the user. The acquisition unit 14 may acquire these pieces of information generated by an external device and then transmitted to the information processing apparatus 50.

In the present exemplary embodiment, a time window in which materials, which are in a state (hereinafter referred to as an "unsuitable state") unsuitable for execution of jobs at a time of creation of a group, reach a state (hereinafter referred to as a "suitable state") suitable for execution of the jobs after creation of the group is found on the basis of the information such as the material information acquired by the acquisition unit 14, and the plan creating unit 16 creates a plan for executing the jobs per group in the time window as described later. That is, the information such as the material information acquired by the acquisition unit 14 can be regarded as information indicating that the materials, which are in the unsuitable state at the time of creation of the group, reach the suitable state after creation of the group.

In the present exemplary embodiment, the plan creating unit 16 creates an execution plan for executing the jobs of the group in the time window in which the materials reach the suitable state (i.e., the time window in which the materials, which are in the unsuitable state at the time of creation of the group, reach the suitable state after creation of the group) by using the material information.

This time window includes a time window in which the materials are more suitable for execution of the jobs than other time windows that are available for the execution plan. For example, this time window is a most suitable time window among plural time windows that constitute the execution plan or a time window more suitable than any one or more of the plural time windows.

The "execution plan" indicates which job is to be executed in which time window. For example, an apparatus executes the jobs in accordance with the execution plan, and an operator and an administrator can grasp schedule of execution of the jobs and progress of execution of the jobs by checking the execution plan.

The "suitable state" refers to a state where materials used for execution of the jobs are available. Specifically, the "suitable state" refers to a state where materials (specifically, sheets of paper) used for execution of the jobs are available in an amount necessary for completion of execution of the jobs.

The "unsuitable state" refers to a state where the materials used for execution of the jobs are unavailable. Specifically, the "unsuitable state" refers to a state where an amount of materials necessary for execution of the jobs is not enough to complete execution of the jobs. That is, "unsuitable state" encompasses a state where there are materials available for execution of the jobs but not in a necessary amount.

The "suitable state" may be a state after elapse of a reasonable period from a state where the materials necessary for execution of the jobs are available in an amount necessary for completion of execution of the jobs. In this case, the "unsuitable state" continues until the reasonable period elapses.

The reasonable period is, for example, a period set so that execution of the jobs is delayed to shorten a period for which printed materials are stored in a storage place. In some cases, printed materials obtained as a result of execution of print jobs are stored in a storage place until a designated delivery deadline of the stored printed materials. In such cases, execution of the print jobs may be often delayed to shorten a period for which the printed materials are stored. In other cases, execution of print jobs is delayed in consideration of a possibility of changes of requested specifications of the print jobs before delivery.

In a case where a deadline is set for products obtained as a result of execution of the jobs, the time window suitable for execution of the jobs is a time window that meets the deadline. Specifically, in a case where March 27 is designated as a deadline for delivery of printed materials, which are obtained as a result of execution of print jobs, the printed materials are carried into a storage place by March 27 in the same year at the latest. The time window that meets the deadline is, for example, a time window that enables execution of the jobs or completion of execution of the jobs on the delivery date, a time window that enables execution of the jobs or completion of execution of the jobs before the delivery date, a time window that is included in a certain period before the delivery date and is closest to the delivery date, or a latest time window in which the jobs are executed or execution of the jobs is completed among time windows before the delivery date. That is, the time window suitable for execution of the jobs may vary depending on a condition that is added as long as the deadline is met. For example, the time window suitable for execution of the jobs may be set so that the printed materials are carried into the storage place in the morning on March 27, which is the delivery date, the printed materials are carried into the storage place on March 20, which is one week before the delivery date, or the printed materials are carried into the storage place immediately before end of operation on March 26.

As described above, the time window suitable for execution of the jobs may be a latest one of time windows in which the materials are available and that meet a deadline for products obtained as a result of execution of the jobs.

Operation According to First Exemplary Embodiment

Figure 8:
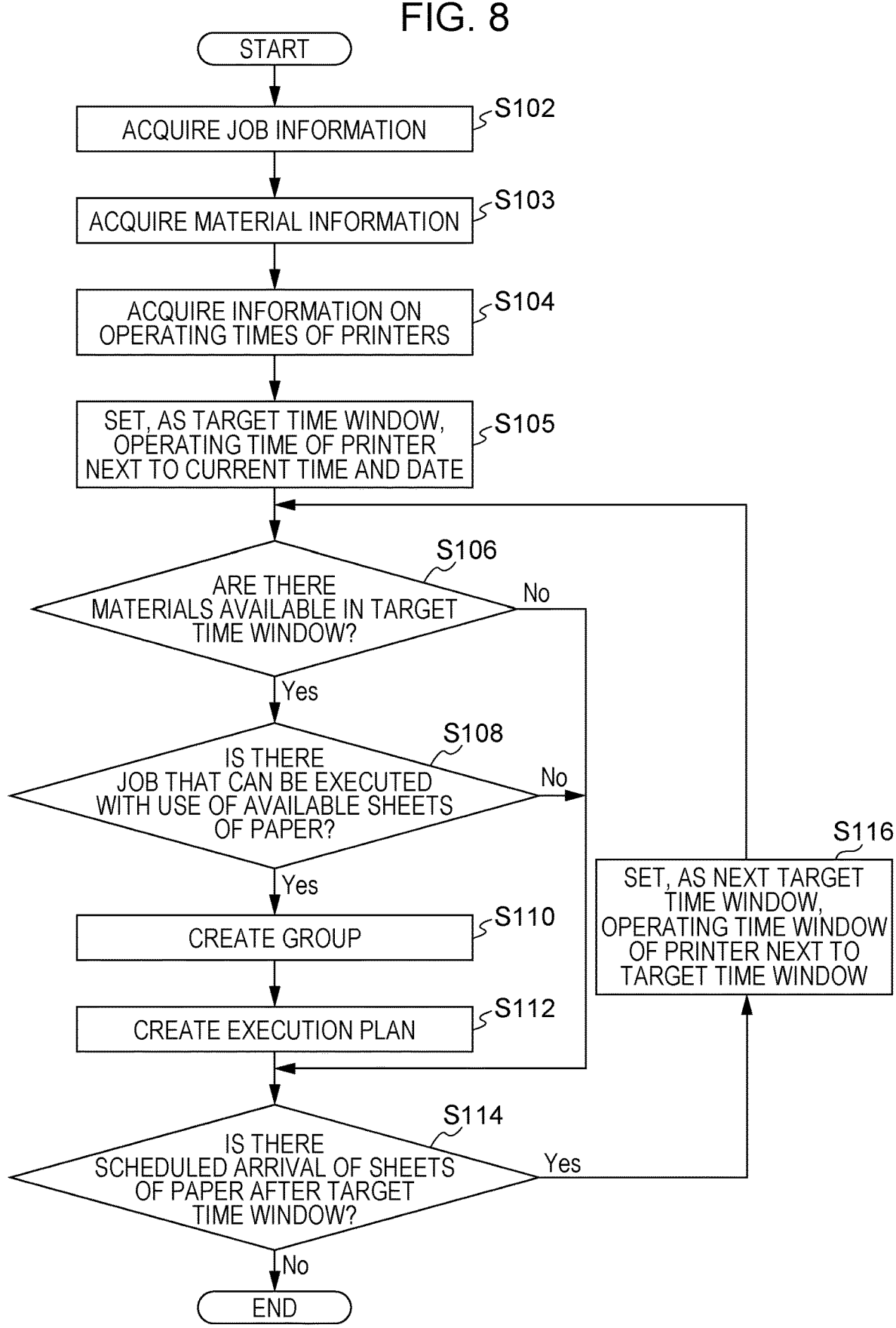
FIG. 8 is a flowchart illustrating flow of execution plan creating processing executed by the information processing apparatus according to the first exemplary embodiment.

Next, operation according to the present exemplary embodiment is described. FIG. 8 is a flowchart illustrating flow of execution plan creating processing executed by the information processing apparatus 50. The execution plan creating processing is processing for creating an execution plan for executing jobs. The execution plan creating processing is an example of information processing. The execution plan creating processing starts, for example, upon receipt of an instruction to execute the execution plan creating processing given by a user by using the input unit 56.

The CPU 51 executes the execution plan creating processing according to the present exemplary embodiment by reading out an execution plan creating processing program from the ROM 52 or the storage 54 and executing the execution plan creating processing program thus read out.

As illustrated in FIG. 8, when the execution plan creating processing starts, the CPU 51 acquires job information on jobs to be executed from the printer 20A or 20B through the communication line 19 (step S102). Furthermore, the CPU 51 causes the job information to be stored in the storage 54, for example, as the database 54A illustrated in FIG. 5. As described earlier, the job information includes information on the number of copies (specifically, the number of copies to be printed) obtained as a result of execution of the jobs and information on an attribute of the jobs (e.g., the kind of paper used for printing).

In the following description, it is assumed that the job information is acquired from the printer 20A. In the present exemplary embodiment, for example, it is assumed that there are two kinds of paper (paper A and paper B) used for printing by the jobs as illustrated in FIG. 5. Furthermore, it is assumed that the jobs are arranged, for example, in an order of acquisition starting from a job 1.

Next, the CPU 51 acquires material information entered by the user by using the input unit 56 (step S103). Specifically, the CPU 51 acquires, as the material information, information on the number of materials currently in stock, information on schedule of arrival of materials (specifically, scheduled time and date of arrival of the materials and the number of materials scheduled to arrive), and information on current time and date. The CPU 51 causes the material information to be stored in the storage 54 as the database 54B illustrated in FIG. 6. In the present exemplary embodiment, for example, the current time and date are a time of creation of a group. That is, the CPU 51 acquires information on the time of creation of a group as the information on the current time and date.

In the present exemplary embodiment, for example, the number of sheets of paper A currently in stock is 9000 and the number of sheets of paper B currently in stock is 8000 as illustrated in FIG. 6. In the present exemplary embodiment, for example, 5000 sheets of paper A and 5000 sheets of paper B are scheduled to arrive at 17:00 on January 10. Furthermore, in the present exemplary embodiment, for example, the current time and date are 7:00 on January 10.

In the present exemplary embodiment, the current time and date are the time of creation of a group but is not limited to this. For example, a scheduled time of end of the execution plan creating processing may be the time of creation of a group. The scheduled time is, for example, time and date after elapse of a predetermined period from the current time and date. The time of creation of a group is desirable set, for example, within a period from start to end of the execution plan creating processing.

Next, the CPU 51 acquires information on operating times of the printers 20A and 20B entered, for example, by the user by using the input unit 56 (step S104). This information is stored in the storage 54 as the database 54C illustrated in FIG. 7. In the present exemplary embodiment, for example, the operating time window of the printer 20A is 8:00 to 18:00 and the operating time window of the printer 20B is 9:00 to 19:00 as illustrated in FIG. 7.

Next, the CPU 51 sets, as an operating time window to be subjected to determination (hereinafter referred to as a target time window), an operating time window of the printer 20A (i.e., the printer 20 from which the job information has been acquired) next to the current time and date (7:00 on January 10 in the present exemplary embodiment) (step S105).

Specifically, in the present exemplary embodiment, for example, the CPU 51 sets 8:00 to 18:00 on January 10 as the target time window.

Next, the CPU 51 determines whether or not there are materials available in the target time window (8:00 to 18:00 on January 10) (step S106). In a case where the CPU 51 determines in step S106 that there are materials available in the target time window, the CPU 51 proceeds to step S108.

Meanwhile, in a case where the CPU 51 determines in step S106 that materials are unavailable in the target time window, the CPU 51 proceeds to step S114.

In the present exemplary embodiment, 9000 sheets of paper A and 8000 sheets of paper B, which are currently in stock, are available in the target time window (8:00 to 18:00 on January 10). Accordingly, the CPU 51 determines in step S106 that there are materials available in the target time window and proceeds to step S108.

In step S108, the CPU 51 determines whether or not there is a job that can be executed with the use of the available sheets of paper. In a case where the CPU 51 determines in step S108 that there is a job that can be executed, the CPU 51 proceeds to step S110. Meanwhile, in a case where the CPU 51 determines in step S108 that there is no job that can be executed, the CPU 51 proceeds to step S114.

In the present exemplary embodiment, 9000 sheets of paper A are available and the job 1 uses 3000 sheets of paper A for printing. Accordingly, the CPU 51 determines in step S108 that there is a job that can be executed and proceeds to step S110.

In step S110, the CPU 51 creates a group of jobs having a common job attribute so that the number of materials consumed by execution of the jobs is kept equal to or smaller than the number of available materials.

In the present exemplary embodiment, first, the CPU 51 creates a group of jobs using the paper A so that the number of sheets of paper A consumed by execution of the jobs is kept equal to or smaller than the number (9000) of sheets of paper A available in the target time window (8:00 to 18:00 on January 10). In the present exemplary embodiment, for example, the CPU 51 creates a group 1 made up of the job 1 (which prints 3000 copies) and a job 3 (which prints 5000 copies) as illustrated in FIG. 9. In the present exemplary embodiment, the CPU 51 creates a group by adding a job to the group one by one starting from the job 1 and eliminating the last job added to the group when the number of sheets of paper consumed by execution of jobs added to the group exceeds the number of sheets of paper available in the target time window.

Note that the order in which a job is added to a group may be decided on the basis of a predetermined standard. A known algorithm (knapsack problem) may be used to create a group so that as many available materials as possible are used.

As described above, the CPU 51 creates the group 1 including the job 1 (which prints 3000 copies) and the job 3 (which prints 5000 copies), which use the same kind of paper and consume a smaller number of sheets of paper than or an equal number of sheets or paper to the number of sheets of paper available in the target time window (8:00 to 18:00 on January 10). In other words, the sheets of paper A, which are materials, are in a state suitable for execution of the job 1 and the job 3 in the target time window (8:00 to 18:00 on January 10).

Next, the CPU 51 creates a group of jobs that use the paper B so that the number of sheets of paper B consumed by execution of the jobs is kept equal to or smaller than the number (8000) of sheets of paper B available in the target time window (8:00 to 18:00 on January 10). In the present exemplary embodiment, for example, the CPU 51 creates a group 2 made up of a job 2 (which prints 5000 copies) as illustrated in FIG. 9.

In other words, the sheets of paper B, which are materials, are in a state suitable for execution of the job 2 in the target time window (8:00 to 18:00 on January 10).

Next, the CPU 51 creates an execution plan so that the jobs of the groups created in step S110 are executed in the time window suitable for execution (step S112).

Specifically, in the present exemplary embodiment, the CPU 51 creates an execution plan so that the job 1 and the job 3 of the group 1 and the job 2 of the group 2 are executed in the target time window (8:00 to 18:00 on January 10) as illustrated in FIG. 10.

Next, the CPU 51 determines whether or not there is scheduled arrival of sheets of paper after the target time window (8:00 to 18:00 on January 10) (step S114). In a case where the CPU 51 determines in step S114 that there is scheduled arrival of sheets of paper, the CPU 51 proceeds to step S116. Meanwhile, in a case where the CPU 51 determines in step S114 that there is no scheduled arrival of sheets of paper, the CPU 51 finishes the execution plan creating processing.

In the present exemplary embodiment, 5000 sheets of paper A and 5000 sheets of paper B are scheduled to arrive at 17:00 on January 10 (see FIG. 6). Accordingly, the CPU 51 determines in step S114 that there is scheduled arrival of sheets of paper and proceeds to step S116.

In step S116, the CPU 51 sets, as a next target time window, an operating time window of the printer 20A next to the target time window (8:00 to 18:00 on January 10) and returns to step S106. Specifically, in the present exemplary embodiment, the CPU 51 sets 8:00 to 18:00 on January 11 as the next target time window.

Thereafter, the steps are repeated until it is determined in step S114 that there is no scheduled arrival of sheets of paper. In the present exemplary embodiment, the execution plan creating processing is finished through steps as described below.

In step S106, the CPU 51 determines whether or not there are materials available in the target time window (8:00 to 18:00 on January 11). In the present exemplary embodiment, 6000 sheets of paper A and 8000 sheets of paper B are available in the target time window (8:00 to 18:00 on January 11). Accordingly, the CPU 51 determines in step S106 that there are materials available in the target time window (8:00 to 18:00 on January 11) and proceeds to step S108.

Specifically, the number of available sheets of paper is calculated as follows: (the number of sheets or paper currently in stock)−(the number of sheets of paper used in the previous target time window (8:00 to 18:00 on January 10))+(the number of sheets of paper scheduled to arrive). The number of available sheets of paper A is calculated as follows: 9000−8000+5000=6000, and the number of available sheets of paper B is calculated as follows: 8000−5000+5000=8000.

In step S108, the CPU 51 determines whether or not there is a job that can be executed with use of the available materials. In the present exemplary embodiment, 6000 sheets of paper A are available and the job 4 uses 5000 sheets of paper A for printing. Accordingly, the CPU 51 determines in step S108 that there is a job that can be executed and proceeds to step S110.

In step S110, the CPU 51 creates a group of jobs having a common job attribute so that the number of materials consumed by execution of the jobs is kept equal to or smaller than the number of materials.

In the present exemplary embodiment, first, the CPU 51 creates a group of jobs using the paper A so that the number of sheets of paper A consumed by execution of the jobs is kept equal to or smaller than the number of sheets of paper A available in the target time window (8:00 to 18:00 on January 11). In the present exemplary embodiment, for example, the CPU 51 creates a group 3 made up of a job 4 (which prints 5000 copies) as illustrated in FIG. 11.

In other words, it can be said that the sheets of paper A, which are materials, are in a state suitable for execution of the job 4 in the target time window (8:00 to 18:00 on January 11).

Next, the CPU 51 creates a group of jobs using the paper B so that the number of sheets of paper B consumed by execution of the jobs is kept equal to or smaller than the number (8000) of sheets of paper B available in the target time window (8:00 to 18:00 on January 11). In the present exemplary embodiment, for example, the CPU 51 creates a group 4 made up of a job 5 (which prints 4000 copies) and a job 8 (which prints 4000 copies) as illustrated in FIG. 11.

In other words, it can be said that the sheets of paper B, which are materials, are in a state suitable for execution of the job 5 and the job 8 in the target time window (8:00 to 18:00 on January 11).

Next, the CPU 51 creates an execution plan so that the jobs of the groups created in step S110 are executed in the time window suitable for execution (step S112).

Specifically, in the present exemplary embodiment, the CPU 51 creates an execution plan so that the job 4 of the group 3 and the jobs 5 and 8 of the group 4 are executed in the target time window (8:00 to 18:00 on January 11), as illustrated in FIG. 12.

Next, the CPU 51 determines whether or not there is scheduled arrival of sheets of paper after the target time window (step S114). In the present exemplary embodiment, there is no scheduled arrival of sheets of paper.

Accordingly, the CPU 51 determines in step S114 that there is no scheduled arrival of sheets of paper and finishes the execution plan creating processing.

The created execution plan (see FIG. 12) is displayed on the display 57 of the information processing apparatus 50. Note that the execution plan may be printed by the printer 20A.

Furthermore, the printer 20A operates in accordance with the execution plan created by the information processing apparatus 50. That is, the printer 20A reads out the execution plan created by the information processing apparatus 50 through the communication line 19 and executes print jobs in accordance with the execution plan.

As described above, in the present exemplary embodiment, an execution plan is created so that jobs of a group are executed in a time window in which materials reach a suitable state after creation of the group by using information indicating that the materials, which are in an unsuitable state at a time of creation of the group, reach a suitable state after creation of the group. Accordingly, even in a case where materials are in an unsuitable state at a time of creation of a group of jobs having a common attribute, an execution plan can be created so that the jobs are executed per group in a time window in which the materials reach a state suitable for execution of the jobs.

Specifically, in the present exemplary embodiment, an execution plan is created so that jobs of a group are executed in an operating time window from start to end of operation of the printer 20. The operating time window is managed for each printer 20. In this way, an execution plan can be created for each printer 20 by allocating jobs to operating time windows of the printer 20.

More specifically, in the present exemplary embodiment, an execution plan is created so that jobs of a group are executed in an operating time window in which materials have become available or a later operating time window. That is, jobs can be allocated to a time window in which materials are available.

In the present exemplary embodiment, for example, in a case where 19:00 on January 12 is set as a delivery deadline of printed materials produced by the job 1 and the job 3, an execution plan may be created so that the jobs are executed in an operating time window (8:00 to 18:00 on January 12) immediately before the delivery deadline. This shortens a period for which the printed materials are stored in a storage place, thereby keeping cost for the storage place low. Furthermore, a period for which changes in print conditions can be addressed is kept long.

Second Exemplary Embodiment

Next, a second exemplary embodiment is described. Constituent elements identical to those in the first exemplary embodiment are given identical reference signs, and description thereof is omitted as appropriate.

Although an acquisition unit 14 acquires material information in the first exemplary embodiment, the acquisition unit 14 acquires information (hereinafter referred to as storage place information) on a storage place for storing products obtained as a result of execution of jobs before execution of the jobs in the present exemplary embodiment.

The storage place information is information on a place in which printed sheets of paper (i.e., printed materials, which are an example of products obtained as a result of execution of jobs) are stored until delivery.

Specifically, the acquisition unit 14 acquires, as the storage place information, information on the number of printed materials that are stockable at a time of creation of a group and information on scheduled time and date of increase of the number of stockable printed materials after creation of the group and the number of printed materials scheduled to newly become stockable after creation of the group. Furthermore, the acquisition unit 14 acquires current time and date as information on the time of creation of the group. The acquisition unit 14 acquires the information on the current time and date from a timer 58.

The storage place information acquired by the acquisition unit 14 is stored in a storage 54 as a database 54D (see FIG. 13). Specifically, the information on the number of printed materials that are currently stockable, the scheduled time and date of increase of the number of stockable printed materials, and the number of printed materials scheduled to newly become stockable is stored in the storage 54 as the database 54D as illustrated in FIG. 13.

In the present exemplary embodiment, the storage place information and information on operating time windows of printers 20 are entered by a user by using an input unit 56, and the acquisition unit 14 acquires these pieces of information thus entered. The acquisition unit 14 may acquire these pieces of information generated by an external device and then transmitted to the information processing apparatus 50.

In the present exemplary embodiment, a time window in which a storage place, which is in a state (hereinafter referred to as an unsuitable state) that is unsuitable for execution of jobs of a group at a time of creation of the group, reaches a state (hereinafter referred to as a suitable state) that is suitable for execution of the jobs after creation of the group is found on the basis of the information such as the storage place information acquired by the acquisition unit 14, and a plan creating unit 16 creates an execution plan so that the jobs are executed per group in the time window as described later. That is, it can be said that the information such as the storage place information acquired by the acquisition unit 14 is information indicating that the storage place, which is in the unsuitable state at the time of creation of the group, reach the suitable state after creation of the group.

In the second exemplary embodiment, the plan creating unit 16 creates an execution plan so that the jobs of the group are executed in the time window in which the storage place reaches the suitable state (i.e., the time window in which the storage place, which is in the unsuitable state at the time of creation of the group, reach the suitable state after creation of the group) by using the storage place information.

This time window includes a time window in which the storage place for storing products obtained as a result of execution of the jobs is more suitable for execution of the jobs than other time windows that are available for the execution plan. For example, this time window is a most suitable time window among plural time windows that constitute the execution plan or a time window more suitable than any one or more of the plural time windows.

The "suitable state" refers to a state where the storage place is available. Specifically, the "suitable state" refers to a state where the storage place has a space for storing a necessary amount of printed materials (specifically, the necessary number of printed materials). The "time window in which the storage place reaches the suitable state" includes a state in which the storage place does not have an enough space at a time of execution of the jobs but has an enough space at a time of completion of the jobs or at a time of transportation into the storage place.

The "unsuitable state" refers to a state where the storage place is unavailable. Specifically, the "unsuitable state" refers to a state where the storage place does not have a space for storing a necessary amount of printed materials (specifically, the necessary number of printed materials). That is, the "unsuitable state" includes a state where the storage place has a space for storing printed materials but not in a necessary amount.

The "suitable state" may be a state after elapse of a reasonable period from a state where the storage place has a space for storing a necessary amount. In this case, the "unsuitable state" continues until the reasonable period elapses.

The reasonable period is, for example, a period set so that execution of the jobs is delayed to shorten a period of storage in the storage place. In some cases, printed materials obtained as a result of execution of print jobs are stored in a storage place until a designated delivery deadline of the printed materials. In such cases, execution of the print jobs may be often delayed to shorten a period of storage of the printed materials. In other cases, execution of the print jobs is delayed in consideration of a possibility of changes of requested specifications of the print jobs before delivery.

In a case where a deadline is set for products obtained as a result of execution of the jobs, the time window suitable for execution of the jobs is a time window that meets the deadline. Specifically, in a case where March 27 is designated as a deadline for delivery of printed materials, which are obtained as a result of execution of print jobs, the printed materials are carried into a storage place by March 27 in the same year at the latest. The time window that meets the deadline is, for example, a time window that enables execution of the jobs or completion of execution of the jobs on the delivery date, a time window that enables execution of the jobs or completion of execution of the jobs before the delivery date, a time window that is included in a certain period before the delivery date and is closest to the delivery date, or a latest time window in which the jobs are executed or execution of the jobs is completed among time windows before the delivery date. That is, the time window suitable for execution of the jobs may vary depending on a condition that is added as long as the deadline is met. For example, the time window suitable for execution of the jobs may be set so that the printed materials are carried into the storage place in the morning on March 27, which is the delivery date, the printed materials are carried into the storage place on March 20, which is one week before the delivery date, or the printed materials are carried into the storage place immediately before end of operation on March 26.

As described above, the time window suitable for execution of the jobs may be a latest one of time windows in which the storage place is available and that meet a deadline for products obtained as a result of execution of the jobs.

Operation According to Second Exemplary Embodiment

Figure 14:
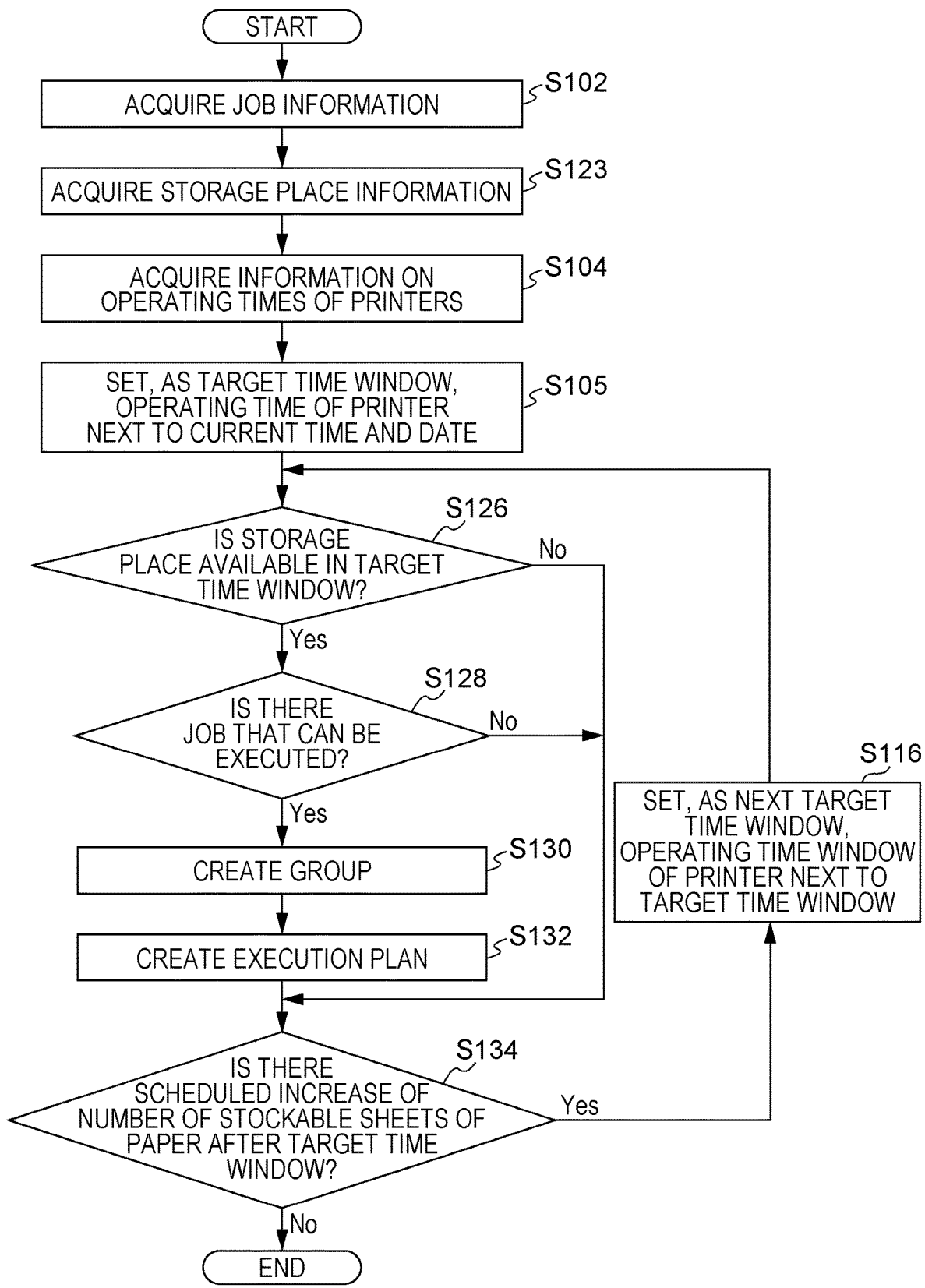
FIG. 14 is a flowchart illustrating flow of execution plan creating processing executed by the information processing apparatus according to the second exemplary embodiment.

Next, operation according to the second exemplary embodiment is described. FIG. 14 is a flowchart illustrating a flow of execution plan creating processing executed by the information processing apparatus 50. Parts identical to those in the processing illustrated in FIG. 8 are given identical reference signs, and description thereof is omitted as appropriate.

Instead of step S103 in FIG. 8, the CPU 51 acquires storage place information entered by a user by using the input unit 56 (step S123). Specifically, the CPU 51 acquires, as the storage place information, information on the number of sheets of paper currently stockable in the storage place, scheduled time and date of increase of the number of stockable sheets of paper, and the number of sheets of paper scheduled to become newly stockable and information on current time and date. Furthermore, the CPU 51 causes the storage place information to be stored in the storage 54 as the database 54D illustrated in FIG. 13. In the present exemplary embodiment, for example, the current time and date are a time of creation of a group. That is, the CPU 51 acquires the information on the current time and date as information on a time of creation of a group.

In the present exemplary embodiment, for example, 17000 sheets of paper are currently stockable as illustrated in FIG. 13. In the present exemplary embodiment, for example, 10000 sheets of paper are scheduled to newly become stockable at 17:00 on January 10. In the present exemplary embodiment, for example, the current time and date are 7:00 on January 10 as illustrated in FIG. 7.

Instead of step S106 in FIG. 8, the CPU 51 determines whether or not the storage place is available in a target time window (8:00 to 18:00 on January 10) (step S126). In a case where the CPU 51 determines in step S126 that the storage place is available, the CPU 51 proceeds to step S128. Meanwhile, in a case where the CPU 51 determines in step S126 that the available storage place is not available, the CPU 51 proceeds to step S134.

In the present exemplary embodiment, 17000 sheets of paper are currently stockable in the target time window (8:00 to 18:00 on January 10). Therefore, the CPU 51 determines in step S126 that the storage place is available and proceeds to step S128.

In step S128, the CPU 51 determines whether or not there is a job that can be executed in the state where the aforementioned number of sheets of paper is stockable. In a case where the CPU 51 determines in step S128 that there is a job that can be executed, the CPU 51 proceeds to step S130.

Meanwhile, in a case where the CPU 51 determines in step S128 that there is no job that can be executed, the CPU 51 proceeds to step S134.

In the present exemplary embodiment, 17000 sheets of paper are currently stockable and a job 1 prints 3000 copies. Therefore, the CPU 51 determines in step S128 that there is a job that can be executed and proceeds to step S130.

In step S130, the CPU 51 creates a group of jobs having a common job attribute so that the number of sheets of paper that need to be stored is kept equal to or smaller than the number of sheets of paper currently stockable.

In the present exemplary embodiment, the CPU 51 creates a group of jobs using paper A and a group of jobs using paper B so that the number of sheets of paper that need to be stored is kept equal to or smaller than the number (17000) of sheets of paper currently stockable in the target time window (8:00 to 18:00 on January 10). In the present exemplary embodiment, for example, the CPU 51 creates a group 1 made up of the job 1 (which prints 3000 copies) and a job 3 (which prints 5000 copies) and creates a group 2 made up of a job 2 (which prints 5000 copies) as illustrated in FIG. 9.

In other words, it can be said that the storage place is in a state suitable for execution of the jobs 1 and 3 of the group 1 and the job 2 of the group 2 in the target time window (8:00 to 18:00 on January 10).

Next, the CPU 51 creates an execution plan so that the jobs of the groups created in step S130 are executed in the time window in which the storage place reaches a state suitable for execution of the jobs (step S132).

Specifically, in the present exemplary embodiment, the CPU 51 creates an execution plan so that the jobs 1 and 3 of the group 1 and the job 2 of the group 2 are executed in the target time window (8:00 to 18:00 on January 10), as illustrated in FIG. 10.

Next, the CPU 51 determines whether or not there is scheduled increase of the number of stockable sheets of paper after the target time window (8:00 to 18:00 on January 10) (step S134). In a case where the CPU 51 determines in step S134 that there is scheduled increase of the number of stockable sheets of paper, the CPU 51 proceeds to step S116. Meanwhile, in a case where the CPU 51 determines in step S134 that there is no scheduled increase of the number of stockable sheets of paper, the CPU 51 finishes the execution plan creating processing.

In the present exemplary embodiment, 10000 sheets of paper are scheduled to newly become stockable at 17:00 on January 10 (see FIG. 13). Therefore, the CPU 51 determines in step S134 that there is scheduled increase of the number of stockable sheets of paper and proceeds to step S116.

In step S116, the CPU 51 sets, as a next target time window, an operating time window of the printer 20A next to the target time window (8:00 to 18:00 on January 10) and proceeds to step S126. Specifically, in the present exemplary embodiment, the CPU 51 sets 8:00 to 18:00 on January 11 as the next time window.

Thereafter, the steps are repeated until the CPU 51 determines in step S134 that there is no scheduled increase of the number of stockable sheets of paper. In the present exemplary embodiment, the execution plan creating processing is finished through steps as described above.

In step S126, the CPU 51 determines whether or not the storage place is available in the target time window (8:00 to 18:00 on January 11). In the present exemplary embodiment, 14000 sheets of paper are currently stockable in the target time window (8:00 to 18:00 on January 11). Therefore, the CPU 51 determines in step S126 that the storage place is available and proceeds to step S128.

Specifically, the number of stockable sheets of paper is calculated as follows: (the number of sheets of paper currently stockable)−(the number of sheets of paper stored in the previous time window (8:00 to 18:00 on January 10)+(the number of sheets of paper scheduled to newly become stockable). Accordingly, the number of stockable sheets of paper is calculated as follows: 17000−13000+10000=14000.

In step S128, the CPU 51 determines whether or not there is a job that can be executed in the state where the aforementioned number of sheets of paper is stockable. In the present exemplary embodiment, 14000 sheets of paper are stockable and the job 4 prints 5000 copies. Therefore, the CPU 51 determines in step S128 that there is a job that can be executed and proceeds to step S130.

In step S130, the CPU 51 creates a group of jobs having a common job attribute so that the number of sheets of paper that need to be stored is kept equal to or smaller than the number of stockable sheets of paper.

In the present exemplary embodiment, the CPU 51 creates a group of jobs using paper A and a group of jobs using paper B so that the number of sheets of paper that need to be stored is kept equal to or smaller than the number (14000) of sheets of paper stockable in the target time window (8:00 to 18:00 on January 11). In the present exemplary embodiment, for example, the CPU 51 creates a group 3 made up of the job 4 (which prints 5000 copies) and a job 6 (which prints 3000 copies) and creates a group 4 made up of a job 5 (which prints 4000 copies), as illustrated in FIG. 15.

In other words, it can be said that the storage place is in a state suitable for execution of the jobs 4 and 6 of the group 3 and the job 5 of the group 4 in the target time window (8:00 to 18:00 on January 11).

Next, the CPU 51 creates an execution plan so that the jobs of the groups created in step S130 are executed in the time window in which the storage place reaches a state suitable for execution of the jobs (step S132).

Specifically, in the present exemplary embodiment, the CPU 51 creates an execution plan so that the jobs 4 and 6 of the group 3 and the job 5 of the group 4 are executed in the target time window (8:00 to 18:00 on January 11) as illustrated in FIG. 16.

Next, the CPU 51 determines whether or not there is scheduled increase of the number of stockable sheets of paper after the target time window (step S134). In the present exemplary embodiment, there is no scheduled increase of the number of stockable sheets of paper. Therefore, the CPU 51 determines in step S134 that there is no scheduled increase of the number of stockable sheets of paper and finishes the execution plan creating processing.

The created execution plan (see FIG. 16) is displayed on a display 57 of the information processing apparatus 50. Note that the execution plan may be printed by the printer 20A.

Furthermore, the printer 20A operates in accordance with the execution plan created by the information processing apparatus 50. That is, the printer 20A reads out the execution plan created by the information processing apparatus 50 through the communication line 19 and executes print jobs in accordance with the execution plan.

As described above, in the present exemplary embodiment, an execution plan is created so that jobs of a group are executed in a time window in which a storage place reaches a suitable state after creation of the group by using information indicating that the storage place, which is in an unsuitable state at a time of creation of the group, reaches the suitable state after creation of the group. Accordingly, even in a case where a storage place is in an unsuitable state at a time of creation of a group, an execution plan can be created so that jobs are executed per group of jobs having a common attribute in a time window in which the storage place reaches a state suitable for execution of the jobs.

Specifically, in the present exemplary embodiment, an execution plan is created so that jobs of a group are executed in an operating time window from start to end of operation of the printer 20. The operating time window is managed for each printer 20. In this way, an execution plan can be created for each printer 20 by allocating jobs to operating time windows of the printer 20.

More specifically, in the present exemplary embodiment, an execution plan is created so that jobs of a group are executed in an operating time window in which a storage place becomes available or a later operating time. That is, jobs can be allocated to a time window in which a storage place is available.

In the present exemplary embodiment, for example, in a case where 19:00 on January 12 is set as a delivery deadline of printed materials produced by the job 1 and the job 3, an execution plan may be created so that the jobs are executed in an operating time window (8:00 to 18:00 on January 12) immediately before the delivery deadline. This shortens a period for which the printed materials are stored in a storage place, thereby keeping cost for the storage place low. Furthermore, a period for which changes in print conditions can be addressed is kept long.

Although the acquisition unit 14 acquires material information in the first exemplary embodiment, the acquisition unit 14 may acquire storage place information before execution of jobs in addition to the material information. According to this configuration, the plan creating unit 16 creates an execution plan so that jobs of a group are executed in a time window in which materials and a storage place, which are in a state (hereinafter referred to as an unsuitable state) that is not suitable for execution of the jobs at a time of creation of the group, reach a state (hereinafter referred to as a suitable state) that is suitable for execution of the jobs after creation of the group by using the material information and the storage place information.

The "suitable state" refers to a state where a necessary amount of materials (specifically, the necessary number of materials) is available and a storage place has a space for storing a necessary amount of printed materials (specifically, the necessary number of printed materials).

The "unsuitable state" refers to a state where a necessary amount of materials (specifically, the necessary number of materials) is unavailable or a state where a storage place does not have an enough space for storing a necessary amount of printed materials (specifically, the necessary number of printed materials).

First Modification

In the first and second exemplary embodiments, for example, an execution plan is created so that the job 1 and the job 3 of the group 1 are executed in an operating time window (8:00 to 18:00 on January 10) of the printer 20 next to the current time and date (7:00 on January 10) as a time window in which materials or a storage place reaches a suitable state after creation of the group as described above. However, this configuration is not restrictive.

For example, an execution plan may be created so that jobs of a group (e.g., the job 1 and the job 3 of the group 1) that can be executed in the operating time window (8:00 to 18:00 on January 10) are executed in an operating time window (e.g., 8:00 to 18:00 on January 11) that comes after the operating time window (8:00 to 18:00 on January 10).

That is, an execution plan may be created so that jobs of a group are executed in an operating time window of the printer 20 later than a time window in which materials or a storage place becomes available. According to this configuration, jobs can be allocated to a time window later than a time which in which the materials or the storage place becomes available.

In the present modification, an operating time window in which jobs of a group are executed is delayed. This shortens a period for which printed materials are stored in a storage place, thereby keeping cost for the storage place low. Furthermore, a period for which changes in print conditions can be addressed is kept long.

In the present modification, the operating time window (8:00 to 18:00 on January 10) is an example of "another time window", and an operating time window (e.g., 8:00 to 18:00 on January 11) later than the operating time window (8:00 to 18:00 on January 10) is an example of a "time window in which materials or a storage place is in a state more suitable for execution of jobs than the other time window".

Furthermore, in a case where an operating time window in which jobs of a group are executed is delayed, a group of jobs for producing the same kind of printed materials may be delayed preferentially over a group of jobs for producing different kinds of printed materials.

In other words, an execution plan may be created so that jobs of a group for producing the same kind of printed materials are executed in a time window later than a group for producing different kinds of printed materials. This can make quality of the same kind of printed materials uniform.

Note that the "group for producing the same kind of printed materials" is, for example, a group of jobs for printing the same part (a front cover or a body of a book) in a case where a front cover (part) and a body (part) of a book (finished product) are separately printed.

The "group for producing different kinds of printed materials" is, for example, a group of jobs for printing different parts (a front cover and a body of a book) in a case where a front cover (part) and a body (part) of a book (finished product) are separately printed.

Furthermore, an execution plan may be created so that jobs of a group for producing the same kind of printed material are executed in a latest time window. This shortens a period for which the same kind of printed materials are stored in a storage place, thereby keeping cost for the storage place low. Furthermore, a period for which changes in print conditions of the same kind of printed materials can be addressed is kept long.

Second Modification

Although a period necessary for execution of a job is not considered in creation of an execution plan in the first and second exemplary embodiments, an execution plan may be created in consideration of a period necessary for execution of a job.

In the present modification, an acquisition unit 14 acquires, as job information, information on a period necessary for each job (see the "REQUIRED TIME" field in FIG. 17). Then, a plan creating unit 16 creates an execution plan so that jobs of a group are executed at a specific time in a time window in which materials reach a suitable state (i.e., a time window in which materials, which are in an unsuitable state at a time of creation of a group, reach a suitable state after creation of the group).

Specifically, for example, an execution plan (i.e., schedule) is created so that jobs are allocated to time windows corresponding to periods necessary for execution of the jobs from a start time (8:00) in an operating time window (8:00 to 18:00 on January 10) of a printer 20 in an order of a job 1 of a group 1, a job 3 of the group 1, and a job 2 of a group 2, as illustrated in FIG. 17. Furthermore, for example, an execution plan is created so that jobs are allocated to time windows corresponding to periods necessary for execution of the jobs from a start time (8:00) in an operating time window (8:00 to 18:00 on January 11) of the printer 20 in an order of a job 4 of a group 3, a job 5 of a group 4, and a job 8 of a group 4. In the example illustrated in FIG. 17, an execution plan is created in consideration of periods necessary for execution of jobs on the basis of groups (see FIG. 12) illustrated in the first exemplary embodiment.

Other Modifications

Although a group of jobs having a common job attribute is created so that the number of materials consumed by execution of the jobs is kept equal to or smaller than the number of materials available for printing (so that the number of materials that need to be stored is kept equal to or smaller than the number of stockable materials in the second exemplary embodiment) in the first and second exemplary embodiment, this configuration is not restrictive. For example, a group of jobs having a common attribute may be created first, and then a group may be created on the basis of this group so that the number of materials consumed by execution of jobs is kept equal to or smaller than the number of materials available for printing (so that the number of materials that need to be stored is kept equal to or smaller than the number of stockable materials in the second exemplary embodiment).

Although jobs for printing are executed in the first and second exemplary embodiments, this configuration is not restrictive. For example, jobs for producing specific products may be executed. That is, jobs may be actions for producing specific products.

Although information on an operating time window of a printer 20 is managed for each printer 20 and the acquisition unit 14 acquires this information in the first and second exemplary embodiments, this configuration is not restrictive. For example, information on an operating time window from start to end of operation of a printer 20 may be managed for each operator of the printer 20, the acquisition unit 14 may acquire this information before execution of jobs, and a target time window may be set based on this operating time window. Note that the operator is a person who operates the printer 20. This operator may be the same as or may be different from a person who gives an instruction to create an execution plan for executing jobs.

Although a group of jobs to be executed that have a common attribute is created in accordance with an instruction from a person and an execution plan is created so that the jobs of the group are executed in a time window suitable for execution of the jobs in the first and second exemplary embodiments, this configuration is not restrictive. For example, the group and the execution plan may be created at a preset time without an instruction from a person.

Although the information processing apparatus 50 creates a group of jobs to be executed that have a common attribute and creates an execution plan so that the jobs of the group are executed in a time window suitable for execution of the jobs in the first and second exemplary embodiments, this configuration is not restrictive. For example, an information processing apparatus (e.g., an information processing apparatus of a higher system) different from the information processing apparatus that creates the execution plan may create the group. That is, an information processing apparatus (system) that creates the execution plan and an information processing apparatus (system) that creates the group may be different.

Furthermore, an execution plan may be created so that jobs of a group are executed in a time window in which materials or a storage place, which is in an unsuitable state at a time of creation of the execution plan, reaches a suitable state after creation of the execution plan. That is, a base time for determining whether materials or a storage place are in the unsuitable state or the suitable state may be a time of creation of the execution plan.

The present disclosure is not limited to the above exemplary embodiments and can be modified, changed, and improved in various ways without departing from the spirit of the present disclosure. For example, the above modifications may be combined as appropriate.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to:
   create a group of jobs to be executed that have a common attribute,
   acquire, before execution of the jobs, information on a storage place for storing products obtained as a result of execution of the jobs, the information indicating that the storage place, which is not suitable for execution of the jobs at a time of creation of the group, will reach a state suitable for execution of the jobs after creation of the group, and
   create an execution plan so that the jobs are executed per group in a time window in which the storage place will reach the state suitable for execution of the jobs by using the information, wherein
   the time window is a time window in which the storage place is available and that meets a deadline for the products, and
   the deadline for the products is for one of execution of the jobs, completion of the jobs and delivery of the products.

2. The information processing apparatus according to claim 1, wherein the time window is a time window in which the storage place is in a state more suitable for execution of the jobs than other time windows available for the execution plan.

3. The information processing apparatus according to claim 2, wherein
the time window in which the storage place is in the state more suitable for execution of the jobs is a latest one of time windows in which the storage place is available and that meet the deadline for the products.

4. The information processing apparatus according to claim 1, wherein
the time window is an operating time window from start to end of operation of an apparatus that executes the jobs, and information on the operating time window is managed for each apparatus or each operator of the apparatus.

5. The information processing apparatus according to claim 4, wherein
the time window is the operating time window in which the storage place becomes available or a later operating time window than the operating time window in which the storage place becomes available.

6. The information processing apparatus according to claim 5, wherein
the time window is the operating time window later than the operating time window in which the storage place becomes available.

7. The information processing apparatus according to claim 1, wherein
the processor creates an execution plan so that jobs of a group for producing a same kind of products are executed in a time window later than a time window in which jobs of a group for producing different kinds of products are executed.

8. The information processing apparatus according to claim 7, wherein
the processor creates an execution plan so that the jobs of the group for producing the same kind of products are executed in a latest time window in which a production deadline can be satisfied.

9. An information processing apparatus comprising a processor that is capable of creating an execution plan for executing jobs of a group made up of the jobs that have a common attribute,
the processor being configured to:
acquire, before execution of the jobs, information on a storage place for storing products obtained as a result of execution of the jobs, the information indicating that the storage place, which is not suitable for execution of the jobs at a time of creation of the execution plan, will reach a state suitable for execution of the jobs after creation of the execution plan, and
create the execution plan so that the jobs are executed per group in a time window in which the storage place will reach the state suitable for execution of the jobs by using the information, wherein
the time window is a time window in which the storage place is available and that meets a deadline for the products, and
the deadline for the products is for one of execution of the jobs, completion of the jobs and delivery of the products.

10. A non-transitory computer readable medium storing a program causing a computer to execute a process for information processing, the process comprising:
creating a group of jobs to be executed that have a common attribute;
acquire, before execution of the jobs, information on a storage place for storing products obtained as a result of execution of the jobs, the information indicating that the storage place, which is not suitable for execution of the jobs at a time of creation of the group, will reach a state suitable for execution of the jobs after creation of the group; and
create an execution plan so that the jobs are executed per group in a time window in which the storage place will reach the state suitable for execution of the jobs by using the information, wherein
the time window is a time window in which the storage place is available and that meets a deadline for the products, and
the deadline for the products is for one of execution of the jobs, completion of the jobs and delivery of the products.

* * * * *